United States Patent
Nagata

(10) Patent No.: US 12,449,442 B2
(45) Date of Patent: Oct. 21, 2025

(54) INERTIAL SENSOR AND INERTIAL MEASUREMENT MODULE

(71) Applicant: SEIKO EPSON CORPORATION, Tokyo (JP)

(72) Inventor: Kazuyuki Nagata, Minowa (JP)

(73) Assignee: SEIKO EPSON CORPORATION (JP)

( * ) Notice: Subject to any disclaimer, the term of this patent is extended or adjusted under 35 U.S.C. 154(b) by 337 days.

(21) Appl. No.: 18/194,721

(22) Filed: Apr. 3, 2023

(65) Prior Publication Data

US 2023/0314466 A1    Oct. 5, 2023

(30) Foreign Application Priority Data

Apr. 4, 2022   (JP) .................................. 2022-062428

(51) Int. Cl.
| | | |
|---|---|---|
| *G01P 15/135* | (2006.01) | |
| *G01P 1/02* | (2006.01) | |
| *G01P 15/08* | (2006.01) | |
| *G01P 15/125* | (2006.01) | |
| *G01P 15/18* | (2013.01) | |

(52) U.S. Cl.
CPC ............ *G01P 15/135* (2013.01); *G01P 1/023* (2013.01); *G01P 15/0802* (2013.01); *G01P 15/125* (2013.01); *G01P 15/18* (2013.01); *G01P 2015/0871* (2013.01)

(58) Field of Classification Search
CPC .... G01P 15/125; G01P 15/0802; G01P 15/18; G01P 1/023; G01P 2015/0831; G01P 2015/0882; G01P 2015/0814; G01P 2015/0874
See application file for complete search history.

(56) References Cited

U.S. PATENT DOCUMENTS

| | | | | |
|---|---|---|---|---|
| 6,070,463 A | * | 6/2000 | Moriya .............. | G01C 19/5719 73/504.12 |
| 6,230,566 B1 | * | 5/2001 | Lee ....................... | G01P 15/125 73/514.32 |

(Continued)

FOREIGN PATENT DOCUMENTS

| | | |
|---|---|---|
| EP | 3121605 A1 | 1/2017 |
| JP | 2004233088 A * | 8/2004 |

(Continued)

OTHER PUBLICATIONS

Translation of JP2004-233088.*

*Primary Examiner* — Helen C Kwok
(74) *Attorney, Agent, or Firm* — Harness, Dickey & Pierce, P.L.C.

(57) ABSTRACT

An inertial sensor includes: a substrate; a movable body configured to be displaced with respect to the substrate; and an attenuator configured to attenuate a displacement of the movable body with respect to the substrate. The attenuator includes a comb-shaped first structure including a plurality of movable comb fingers whose base ends are coupled to the movable body, and a comb-shaped second structure including a plurality of fixed comb fingers whose base ends are coupled to the substrate, the plurality of fixed comb fingers intersecting with the plurality of movable comb fingers. A width of the base end of each of the movable comb fingers and the fixed comb fingers is larger than a width of a tip end thereof.

9 Claims, 13 Drawing Sheets

(56) References Cited

U.S. PATENT DOCUMENTS

| | | | | |
|---|---|---|---|---|
| 2004/0187592 | A1* | 9/2004 | Sugiura | G01C 19/5719 73/780 |
| 2005/0126287 | A1* | 6/2005 | Malametz | G01P 15/125 73/514.32 |
| 2006/0185433 | A1* | 8/2006 | Leonardson | G01P 15/125 73/514.32 |
| 2008/0092651 | A1* | 4/2008 | Menard | G01P 15/131 73/488 |
| 2008/0190204 | A1* | 8/2008 | Danel | G01C 19/5755 361/278 |
| 2009/0183568 | A1 | 7/2009 | Yamanaka et al. | |
| 2010/0024552 | A1* | 2/2010 | Foster | G01P 15/131 73/514.32 |
| 2010/0212426 | A1 | 8/2010 | Oshio | |
| 2012/0000287 | A1* | 1/2012 | Frangi | G01P 15/125 73/514.32 |
| 2012/0031185 | A1 | 2/2012 | Classen et al. | |
| 2014/0174182 | A1* | 6/2014 | Narita | G01P 15/125 73/514.32 |
| 2015/0143906 | A1 | 5/2015 | Ogawa | |
| 2016/0169927 | A1* | 6/2016 | Lin | G01P 15/18 73/488 |
| 2016/0169931 | A1* | 6/2016 | Tocchio | G01P 15/02 73/514.01 |
| 2016/0274141 | A1* | 9/2016 | Enjalbert | G01P 15/18 |
| 2017/0363655 | A1* | 12/2017 | Zhang | G01P 15/125 |
| 2018/0217179 | A1 | 8/2018 | Harish et al. | |
| 2018/0275159 | A1 | 9/2018 | Kanamaru et al. | |
| 2020/0182903 | A1* | 6/2020 | Tseng | G01P 15/125 |
| 2021/0070609 | A1* | 3/2021 | Vesterinen | B81B 7/0016 |
| 2021/0072280 | A1* | 3/2021 | Liukku | G01P 15/125 |
| 2021/0171337 | A1* | 6/2021 | Liukku | G01P 1/003 |

FOREIGN PATENT DOCUMENTS

| | | |
|---|---|---|
| JP | 2009-168777 A | 7/2009 |
| JP | 2010-190636 A | 9/2010 |
| JP | 2010-203990 A | 9/2010 |
| JP | 2010-223952 A | 10/2010 |
| JP | 2011-058819 A | 3/2011 |
| JP | 2014-016341 A | 1/2014 |
| JP | 2017-067579 A | 4/2017 |
| JP | 2018-525634 A | 9/2018 |
| JP | 2021-524035 A | 9/2021 |

* cited by examiner

INERTIAL SENSOR AND INERTIAL MEASUREMENT MODULE

The present application is based on, and claims priority from JP Application Serial Number 2022-062428, filed Apr. 4, 2022, the disclosure of which is hereby incorporated by reference herein in its entirety.

BACKGROUND

1. Technical Field

The present disclosure relates to an inertial sensor and an inertial measurement module.

2. Related Art

An inertial sensor described in US Patent Application Publication NO. 2012/0031185 includes a substrate, a movable body that seesaw swings around a swing axis along a Y-axis with respect to the substrate, and a damping attenuation structure that attenuates vibrations of a movable unit in an X-axis direction and a Y-axis direction. The damping attenuation structure includes a comb-shaped first protrusion having a plurality of beams protruding from one end portion of the movable body, and a comb-shaped second protrusion fixed to the substrate and having a plurality of beams meshing with the first protrusion.

However, in the inertial sensor in US Patent Application Publication NO. 2012/0031185, each beam of the damping structure has a cantilever configuration in which a tip end is a free end, and a width thereof is constant in an extending direction. Therefore, there is a problem that, for example, when a large acceleration is applied to the beams and the adjacent beams come into contact with each other, stress is likely to concentrate on a base end portion of the beam, and the beam is likely to be damaged.

SUMMARY

An inertial sensor according to the present disclosure includes:
a substrate;
a movable body configured to be displaced with respect to the substrate; and
an attenuator configured to attenuate a displacement of the movable body with respect to the substrate, in which the attenuator includes
a comb-shaped first structure including a plurality of movable comb fingers whose base ends are coupled to the movable body, and
a comb-shaped second structure including a plurality of fixed comb fingers whose base ends are coupled to the substrate, the plurality of fixed comb fingers meshing with the first structure, and
a width of the base end of each of the movable comb fingers and the fixed comb fingers is larger than a width of a tip end thereof.

An inertial measurement module according to the present disclosure includes the above-described inertial sensor.

DESCRIPTION OF EXEMPLARY EMBODIMENTS

Hereinafter, an inertial sensor and an inertial measurement module according to the present disclosure will be described in detail based on embodiments shown in the accompanying drawings.

Hereinafter, for convenience of description, three axes orthogonal to one another are referred to as an X-axis, a Y-axis, and a Z-axis. In addition, a direction along the X-axis, that is, a direction parallel to the X-axis is also referred to as an "X-axis direction (first direction)", a direction parallel to the Y-axis is also referred to as a "Y-axis direction (second direction)", and a direction parallel to the Z-axis is also referred to as a "Z-axis direction (third direction)". In addition, a tip end side of each axis in an arrow direction is also referred to as a "plus side", and an opposite side is also referred to as a "minus side". The plus side in the Z-axis direction is also referred to as "upper", and the minus side in the Z-axis direction is also referred to as "lower". In the specification of the application, the term "orthogonal" includes not only a case of crossing at 90° but also a case of deviating from 90° within a range in which an effect according to the present disclosure can be exerted.

First Embodiment

Figure 1:
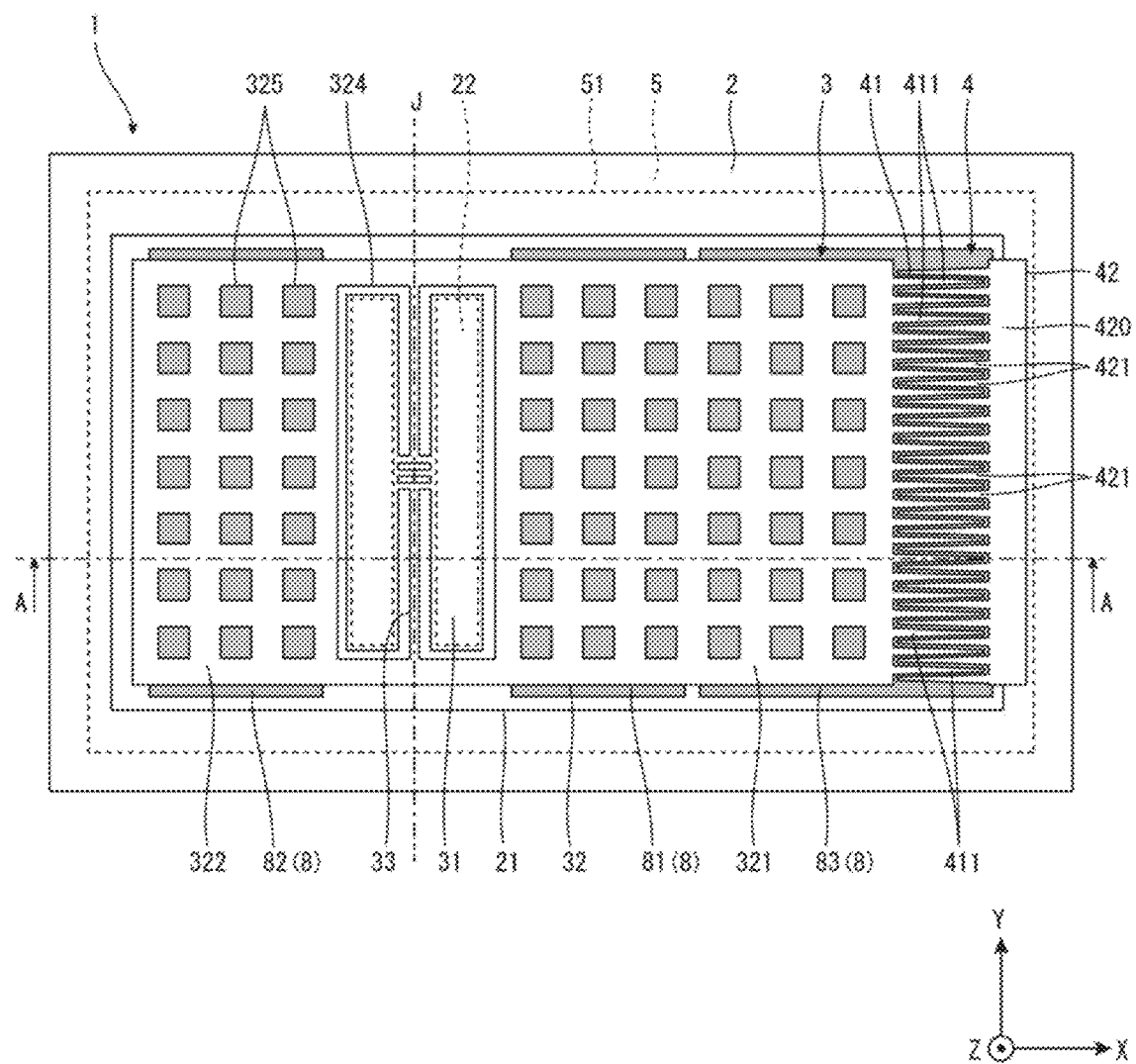
FIG. 1 is a plan view showing an inertial sensor according to a first embodiment.
Figure 2:
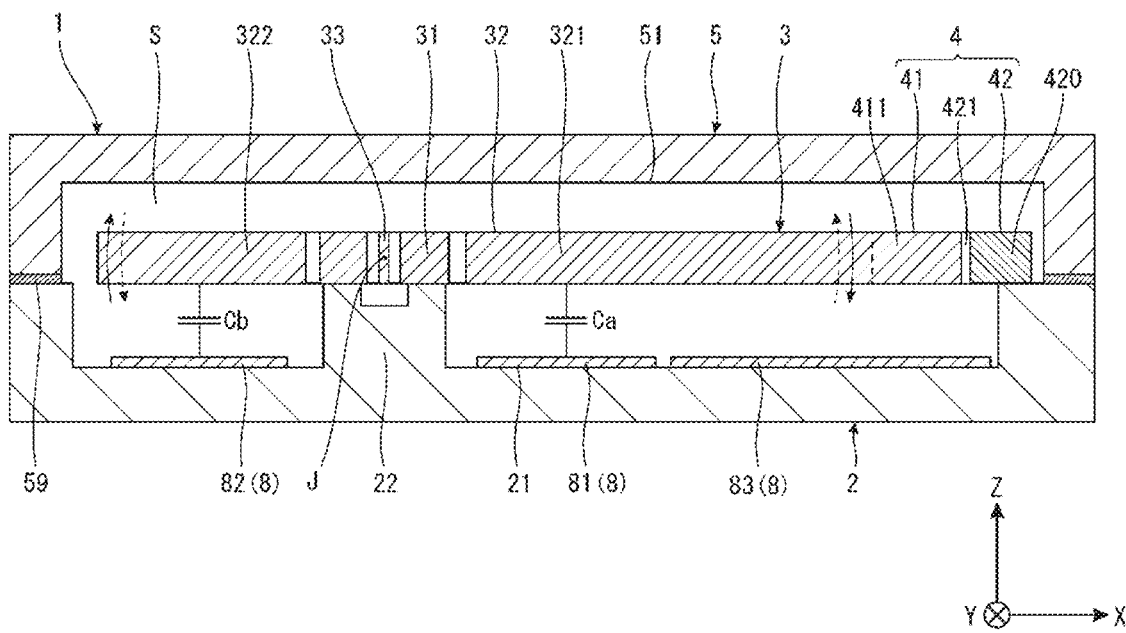
FIG. 2 is a cross-sectional view taken along a line A-A in FIG. 1.
Figure 3:
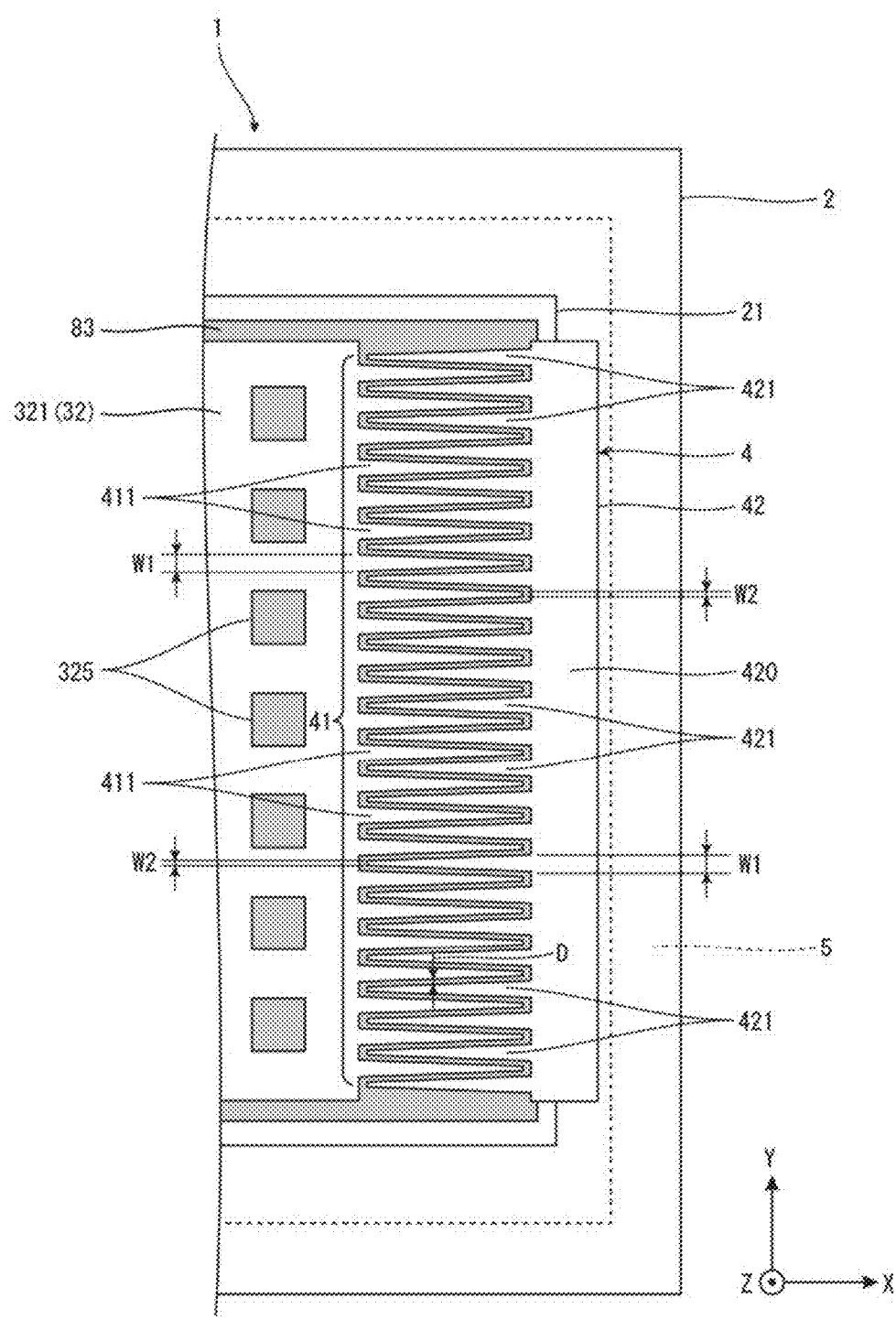
FIG. 3 is a plan view showing an attenuator.
Figure 4:
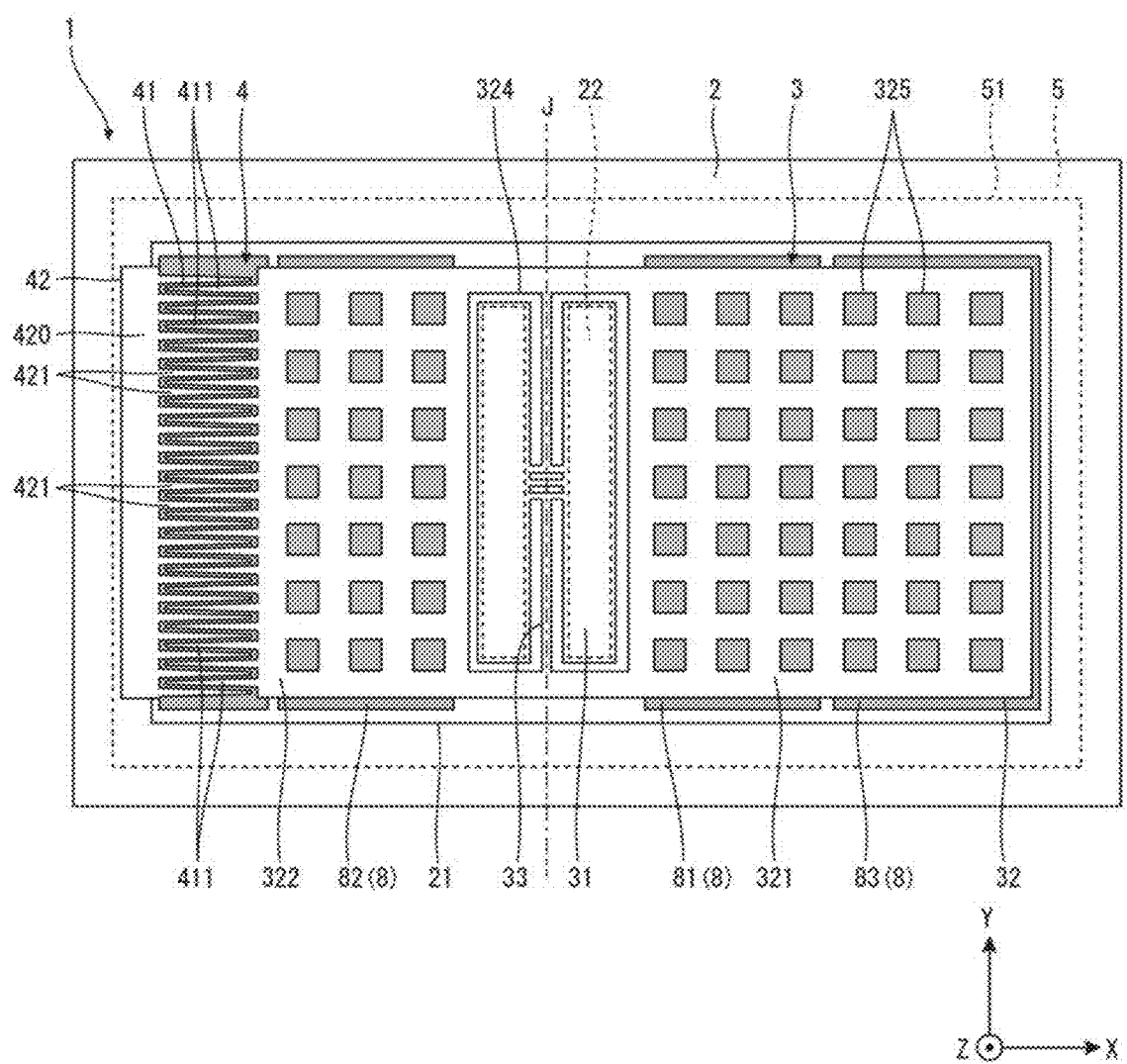
FIG. 4 is a plan view showing a modification of the attenuator.

FIG. 1 is a plan view showing an inertial sensor according to a first embodiment. FIG. 2 is a cross-sectional view taken along a line A-A in FIG. 1. FIG. 3 is a plan view showing an attenuator. FIG. 4 is a plan view showing a modification of the attenuator.

An inertial sensor 1 shown in FIG. 1 is an acceleration sensor that detects an acceleration in the Z-axis direction. The inertial sensor 1 includes a substrate 2, a sensor element 3 disposed on the substrate 2, an attenuator 4 that attenuates a vibration of the sensor element 3, and a lid 5 that covers the sensor element 3 and the attenuator 4 and that is bonded to the substrate 2.

As shown in FIG. 1, the substrate 2 has a recessed portion 21 that is open on an upper surface side. The recessed portion 21 is formed larger than the sensor element 3 such that the recessed portion 21 includes the sensor element 3 inside in a plan view from the Z-axis direction. As shown in FIG. 2, the substrate 2 has a protrusion-shaped mount 22 protruding from a bottom surface of the recessed portion 21. The sensor element 3 is bonded to an upper surface of the mount 22.

The substrate 2 is a substrate of a glass material containing alkali metal ions which are movable ions such as Na+, for example, borosilicate glass such as Pyrex glass or Tempax glass (both are registered trademark). However, the substrate 2 is not particularly limited, and for example, a silicon substrate or a ceramic substrate may be used.

As shown in FIG. 2, the lid 5 has a recessed portion 51 that is open on a lower surface side. The lid 5 accommodates the sensor element 3 and the attenuator 4 in the recessed portion 51 and is bonded to an upper surface of the substrate 2. An accommodation space S for accommodating the sensor element 3 and the attenuator 4 is formed inside the lid 5 and the substrate 2. The accommodation space S is an airtight space in which an inert gas such as nitrogen, helium, or argon is sealed, and it is preferable that the accommodation space S has a substantially atmospheric pressure at a use temperature of, for example, about −40° C. to 120° C. However, an atmosphere of the accommodation space S is not particularly limited, and may be, for example, a depressurized state or a pressurized state.

The lid 5 is, for example, a silicon substrate. However, the lid 5 is not particularly limited, and for example, a glass substrate or a ceramic substrate may be used. A method for bonding the substrate 2 and the lid 5 is not particularly limited, and may be appropriately selected depending on materials of the substrate 2 and the lid 5. For example, anodic bonding, activated bonding in which bonding surfaces activated by plasma irradiation are bonded to each other, bonding using a bonding material such as glass frit, and diffusion bonding in which metal films formed on the upper surface of the substrate 2 and a lower surface of the lid 5 are bonded to each other can be used. In the embodiment, the substrate 2 and the lid 5 are bonded to each other via a glass frit 59 made of low-melting glass.

The sensor element 3 is formed by, for example, etching a conductive silicon substrate doped with an impurity such as phosphorus (P), boron (B), or arsenic (As) and patterning the conductive silicon substrate by a Bosch process which is a deep trench etching technique. As shown in FIG. 1, the sensor element 3 includes a anchor 31 that is bonded to the upper surface of the mount 22, a movable body 32 that seesaw swings around a swing axis J along the Y-axis with respect to the anchor 31, and a beam 33 that couples the anchor 31 and the movable body 32.

The movable body 32 has a rectangular shape whose longitudinal direction is the X-axis direction in a plan view from the Z-axis direction. The movable body 32 includes a first movable unit 321 and a second movable unit 322 which are disposed with the swing axis J interposed therebetween in a plan view from the Z-axis direction. The first movable unit 321 is located on the plus side in the X-axis direction with respect to the swing axis J, and the second movable unit 322 is located on the minus side in the X-axis direction with respect to the swing axis J. The first movable unit 321 is longer than the second movable unit 322 in the X-axis direction, and a rotational moment around the swing axis J when an acceleration in the Z-axis direction is applied is larger than that of the second movable unit 322. Due to a difference in the rotational moments, the movable body 32 seesaw swings around the swing axis J when the acceleration in the Z-axis direction is applied. The seesaw swing means that, as indicated by an arrow in FIG. 2, when the first movable unit 321 is displaced to the plus side in the Z-axis direction, the second movable unit 322 is displaced to the minus side in the Z-axis direction, and conversely, when the first movable unit 321 is displaced to the minus side in the Z-axis direction, the second movable unit 322 is displaced to the plus side in the Z-axis direction. Hereinafter, the seesaw swing is also referred to as a detection vibration.

The movable body 32 has a plurality of through holes 325 penetrating in a thickness direction. The through holes 325 can reduce damping generated between the movable body 32 and the substrate 2 and adjust the degree of damping. However, the through holes 325 may be omitted.

The movable body 32 has an opening 324 located between the first movable unit 321 and the second movable unit 322. The anchor 31 and the beam 33 are disposed in the opening 324. The beam 33 extends along the swing axis J, and allows the movable body 32 to swing around the swing axis J by being torsionally deformed around a central axis of the beam 33. Accordingly, by disposing the anchor 31 and the beam 33 inside the movable body 32, it is possible to reduce a size of the sensor element 3. However, the disposition of the anchor 31 and the beam 33 is not particularly limited, and for example, the anchor 31 and the beam 33 may be located outside the movable body 32.

As shown in FIG. 2, an electrode 8 is provided at the substrate 2. The electrode 8 includes a first fixed detection electrode 81, a second fixed detection electrode 82, and a dummy electrode 83 that are disposed at the bottom surface of the recessed portion 21. The first fixed detection electrode 81 faces a base end portion of the first movable unit 321, the second fixed detection electrode 82 faces the second movable unit 322, and the dummy electrode 83 faces a tip end portion of the first movable unit 321. The dummy electrode 83 is electrically coupled to the movable body 32 by a wiring (not shown) or the like, and has the same potential as the movable body 32.

As shown in FIG. 2, when the inertial sensor 1 is driven, a drive voltage is applied to the sensor element 3. Accordingly, an electrostatic capacitance Ca is formed between the first movable unit 321 and the first fixed detection electrode 81, and an electrostatic capacitance Cb is formed between the second movable unit 322 and the second fixed detection electrode 82. When the acceleration in the Z-axis direction is applied to the inertial sensor 1, the movable body 32 seesaw swings around the swing axis J. Due to the seesaw swing of the movable body 32, a gap between the first movable unit 321 and the first fixed detection electrode 81 and a gap between the second movable unit 322 and the second fixed detection electrode 82 change in opposite phases, and accordingly, the electrostatic capacitances Ca and Cb change in the opposite phases. Therefore, the acceleration in the Z-axis direction received by the inertial sensor 1 can be detected based on a difference between the electrostatic capacitances Ca and Cb.

The attenuator 4 reduces the displacement of the movable body 32 other than the detection vibration, specifically, reduces the displacement in the X-axis direction, the Y-axis direction, and around the Z-axis (hereinafter, displacement other than the detection vibration is also referred to as an "unnecessary vibration"). Therefore, the unnecessary vibration is prevented, the detection vibration of the movable body 32 is stabilized, and the detection accuracy of the inertial sensor 1 is improved.

As shown in FIG. 3, the attenuator 4 includes a movable structure 41 disposed in the movable body 32 and a fixed structure 42 disposed in the substrate 2. The movable structure 41 has a plurality of movable comb fingers 411 extending from an end portion of the movable body 32 on the plus side in the X-axis direction toward the plus side in the X-axis direction and arranged at equal intervals in the Y-axis direction. Each of the movable comb fingers 411 is a cantilever beam whose base end is coupled to the movable body 32 and whose tip end serves as a free end.

The fixed structure 42 is located on the plus side of the movable structure 41 in the X-axis direction. The fixed structure 42 has a base body 420 bonded to the upper surface of the substrate 2, and a plurality of fixed comb fingers 421 extending from the base body 420 toward the minus side in the X-axis direction and arranged at equal intervals in the Y-axis direction. Each of the fixed comb fingers 421 is a cantilever beam whose base end is coupled to the base body 420 and whose tip end serves as a free end.

The movable structure 41 and the fixed structure 42 face each other with a space therebetween, and intersect with each other and mesh with each other. That is, one fixed comb finger 421 is inserted between a pair of adjacent movable comb fingers 411, and the movable comb fingers 411 and the fixed comb fingers 421 are alternately arranged along the Y-axis direction. The fixed structure 42 is electrically coupled to the movable body 32 by a wiring or the like (not shown) and has the same potential as the movable body 32. The fixed structure 42 and the sensor element 3 are formed of the above-described silicon substrate.

According to such a configuration, when the movable body 32 is displaced in the X-axis direction, the Y-axis direction, or around the Z-axis with respect to the substrate 2, a gas between the movable comb fingers 411 and the fixed comb fingers 421 is compressed, so that squeeze film damping occurs, the displacement is prevented, and the generated displacement also rapidly converges. Therefore, the displacement of the movable body 32 other than the detection vibration is prevented, and the detection vibration of the movable body 32 is stabilized. Further, the gas is heated by being compressed, and accordingly, a part of kinetic energy of the movable body 32 is converted into thermal energy. This conversion into the thermal energy also contributes to a vibration attenuation effect.

In order to improve the above-described damping effect while preventing the contact between the movable comb fingers 411 and the fixed comb fingers 421, a distance D between the movable comb fingers 411 and the fixed comb fingers 421 adjacent to each other is preferably about 0.5 μm or more and 2.0 μm or less, and more preferably about 0.5 μm or more and 1.0 μm or less.

Here, when a large acceleration is applied to the inertial sensor 1 and the movable body 32 is largely displaced in the X-axis direction, the Y-axis direction, or around the Z-axis with respect to the substrate 2, the movable comb fingers 411 may collide with the fixed comb fingers 421. Since the movable comb fingers 411 and the fixed comb fingers 421 are cantilever beams as described above, stress may be concentrated on base end portions (root portions) due to the collision, and the base end portions may be damaged. For example, when the movable comb finger 411 or the fixed comb finger 421 is broken by collision, not only the damping effect is reduced, but also other portions are broken or unintended portions are short-circuited due to the broken pieces behaving in the accommodation space S, which causes a failure of the inertial sensor 1 or a decrease in reliability.

Therefore, in the inertial sensor 1, shapes of the movable comb fingers 411 and the fixed comb fingers 421 are devised such that the movable comb fingers 411 and the fixed comb fingers 421 are less likely to be damaged. Specifically, a width W1 of the base end of each of the movable comb fingers 411 and the fixed comb fingers 421 is larger than a width W2 of the tip end of each of the movable comb fingers 411 and the fixed comb fingers 421 in a plan view from the Z-axis direction. That is, W1>W2. Accordingly, the base end portions (root portions) of the movable comb fingers 411 and the fixed comb fingers 421 can be thickened, and a mechanical strength of these portions is increased. Further, since tip end weights of the movable comb fingers 411 and the fixed comb fingers 421 are reduced, load stress applied to the base end portions (root portions) can be reduced. Therefore, damage to the movable comb fingers 411 and the fixed comb fingers 421 due to collision can be effectively prevented.

W1/W2 is preferably 1.2 or more, more preferably 1.5 or more, and still more preferably 2.0 or more. Accordingly, the above-described effects can be more remarkably exhibited.

In particular, in the embodiment, the width of each of the movable comb fingers 411 and the fixed comb fingers 421 gradually decreases from the base end toward the tip end, and each of the movable comb fingers 411 and the fixed comb fingers 421 has a so-called tapered shape. Accordingly, W1>W2 can be achieved with a simple shape. Since there is no step in the middle of the shape, stress concentration at portions other than the base end portions is avoided during collision, and the movable comb fingers 411 and the fixed comb fingers 421 are less likely to be damaged.

In the embodiment, the entire region in an extending direction of the movable comb fingers 411 and the fixed comb fingers 421 is tapered, but the present disclosure is not limited thereto, and only a part in the extending direction may be tapered. For example, only the tip end portions of the movable comb fingers 411 and the fixed comb fingers 421 may be tapered, only the base end portions thereof may be tapered, or only central portions thereof may be tapered.

The inertial sensor 1 has been described above. As described above, the inertial sensor 1 includes the substrate 2, the movable body 32 that is displaced with respect to the substrate 2, and the attenuator 4 that attenuates the displacement of the movable body 32 with respect to the substrate 2. The attenuator 4 includes the comb-shaped movable structure 41 having the plurality of movable comb fingers 411 whose base ends are coupled to the movable body 32, and the comb-shaped fixed structure 42 having the plurality of fixed comb fingers 421 whose base ends are coupled to the substrate 2 and which mesh with the movable structure 41. The width W1 of the base end of each of the movable comb fingers 411 and the fixed comb fingers 421 is larger than the width W2 of the tip end of each of the movable comb fingers 411 and the fixed comb fingers 421. With such a configuration, the base end portions (root portions) of the movable comb fingers 411 and the fixed comb fingers 421 can be thickened, and a mechanical strength of these portions is increased. Further, since the tip end weights of the movable comb fingers 411 and the fixed comb fingers 421 are reduced, load stress applied to the base end portions (root portions) can be reduced. Therefore, damage to the movable comb fingers 411 and the fixed comb fingers 421 due to collision can be effectively prevented.

As described above, each of the movable comb fingers 411 and the fixed comb fingers 421 has a tapered shape in which the width gradually decreases from the base end toward the tip end. Accordingly, W1>W2 can be achieved with a simple shape. Since there is no step in the middle of the shape, stress concentration at portions other than the base end portions is avoided during collision, and the movable comb fingers 411 and the fixed comb fingers 421 are less likely to be damaged.

As described above, when directions orthogonal to one another include the X-axis direction which is a first direction, the Y-axis direction which is a second direction, and the Z-axis direction which is a third direction, the inertial sensor 1 is an acceleration sensor which detects the acceleration in the Z-axis direction by swinging the movable body 32 around the swing axis J along the Y-axis direction with respect to the substrate 2. The movable comb fingers 411 and the fixed comb fingers 421 extend along one of the X-axis direction and the Y-axis direction, and are arranged along the other of the X-axis direction and the Y-axis direction. In particular, in the embodiment, the movable comb fingers 411 and the fixed comb fingers 421 extend along the X-axis direction and are arranged along the Y-axis direction. Accordingly, it is possible to prevent displacement other than the detection vibration which is the swing around the swing axis J, specifically, prevent displacement in the X-axis direction, the Y-axis direction, and around the Z-axis. Therefore, the detection accuracy of the acceleration in the Z-axis direction is improved.

As described above, in the embodiment, the attenuator 4 is disposed on the plus side in the X-axis direction of the movable body 32, and the disposition of the attenuator 4 is not particularly limited. For example, as shown in FIG. 4, the attenuator 4 may be disposed on the minus side in the X-axis direction of the movable body 32. The attenuator 4 may be disposed on both sides of the movable body 32 in the X-axis direction.

Second Embodiment

Figure 5:
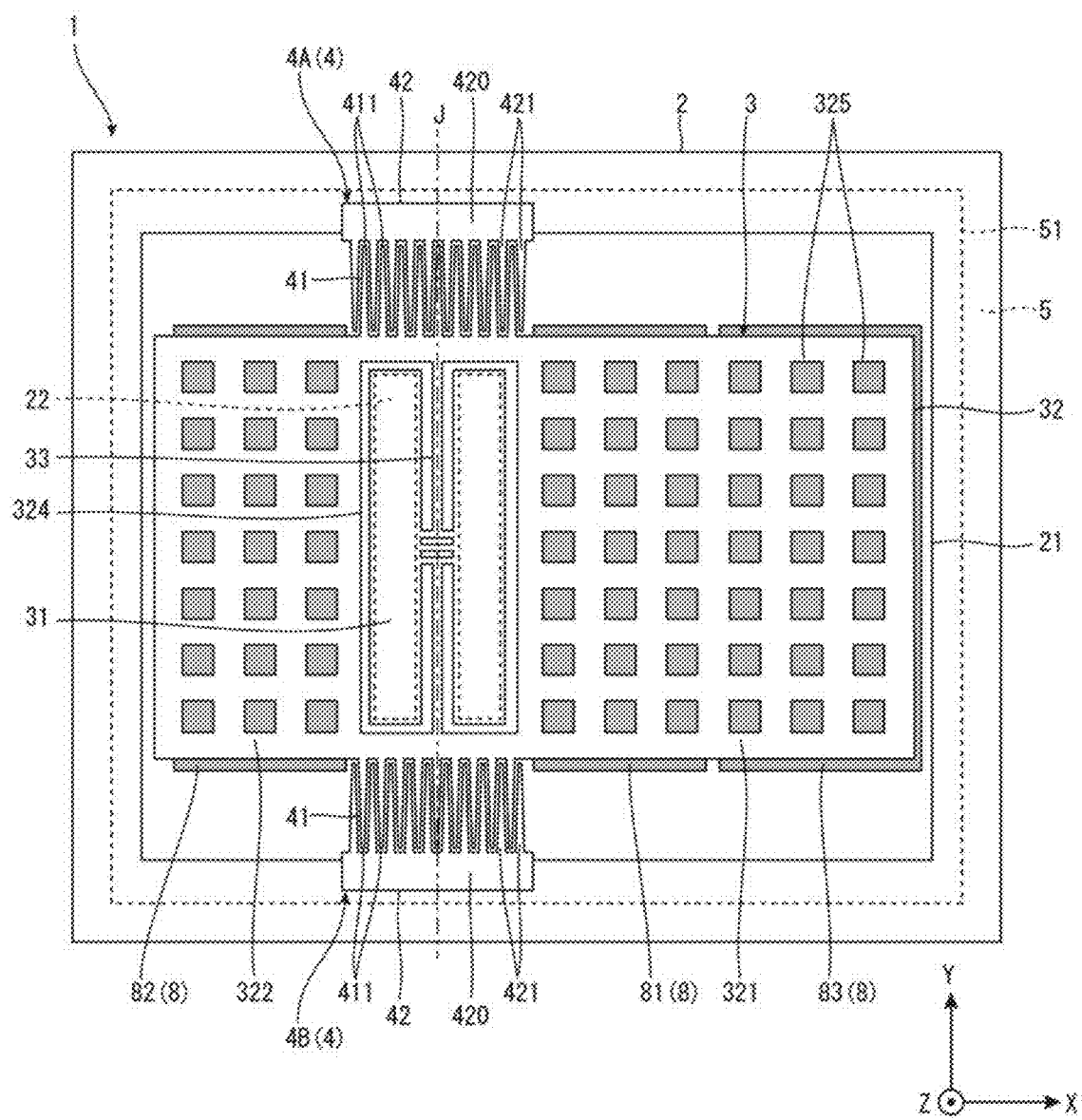
FIG. 5 is a plan view showing an inertial sensor according to a second embodiment.

FIG. 5 is a plan view showing an inertial sensor according to a second embodiment.

The embodiment is the same as the first embodiment described above except that the configuration of the attenuator 4 is different. In the following description, the embodiment will be described focusing on differences from the above-described embodiment, and the description of the same matters will be omitted. In the drawings of the embodiment, configurations similar to those according to the above-described embodiment will be denoted by the same reference signs.

As shown in FIG. 5, the attenuator 4 according to the embodiment includes a first attenuator 4A located on the plus side in the Y-axis direction of the movable body 32, and a second attenuator 4B located on the minus side in the Y-axis direction of the movable body 32. The first and second attenuators 4A and 4B are located between the first movable unit 321 and the second movable unit 322, and the first and second attenuators 4A and 4B and the opening 324 are disposed side by side along the Y-axis direction. However, the disposition of the first and second attenuators 4A and 4B is not particularly limited, and for example, the first and second attenuators 4A and 4B may be located on both sides of the first movable unit 321 in the Y-axis direction, or may be located on both sides of the second movable unit 322 in the Y-axis direction.

In the first attenuator 4A, the movable structure 41 includes the plurality of movable comb fingers 411 extending from the end portion of the movable body 32 on the plus side in the Y-axis direction toward the plus side in the Y-axis direction and arranged at equal intervals in the X-axis direction. The fixed structure 42 is disposed on the plus side in the Y-axis direction of the movable structure 41. The fixed structure 42 includes the base body 420 bonded to the upper surface of the substrate 2, and the plurality of fixed comb fingers 421 extending from the base body 420 toward the minus side in the Y-axis direction and arranged at equal intervals in the X-axis direction.

On the other hand, in the second attenuator 4B, the movable structure 41 includes the plurality of movable comb fingers 411 extending from the end portion of the movable body 32 on the minus side in the Y-axis direction toward the minus side in the Y-axis direction and arranged at equal intervals in the X-axis direction. The fixed structure 42 is disposed on the minus side in the Y-axis direction of the movable structure 41. The fixed structure 42 includes the base body 420 bonded to the upper surface of the substrate 2, and the plurality of fixed comb fingers 421 extending from the base body 420 toward the plus side in the Y-axis direction and arranged at equal intervals in the X-axis direction.

The second embodiment can also exert the same effect as that according to the first embodiment described above.

Third Embodiment

Figure 6:
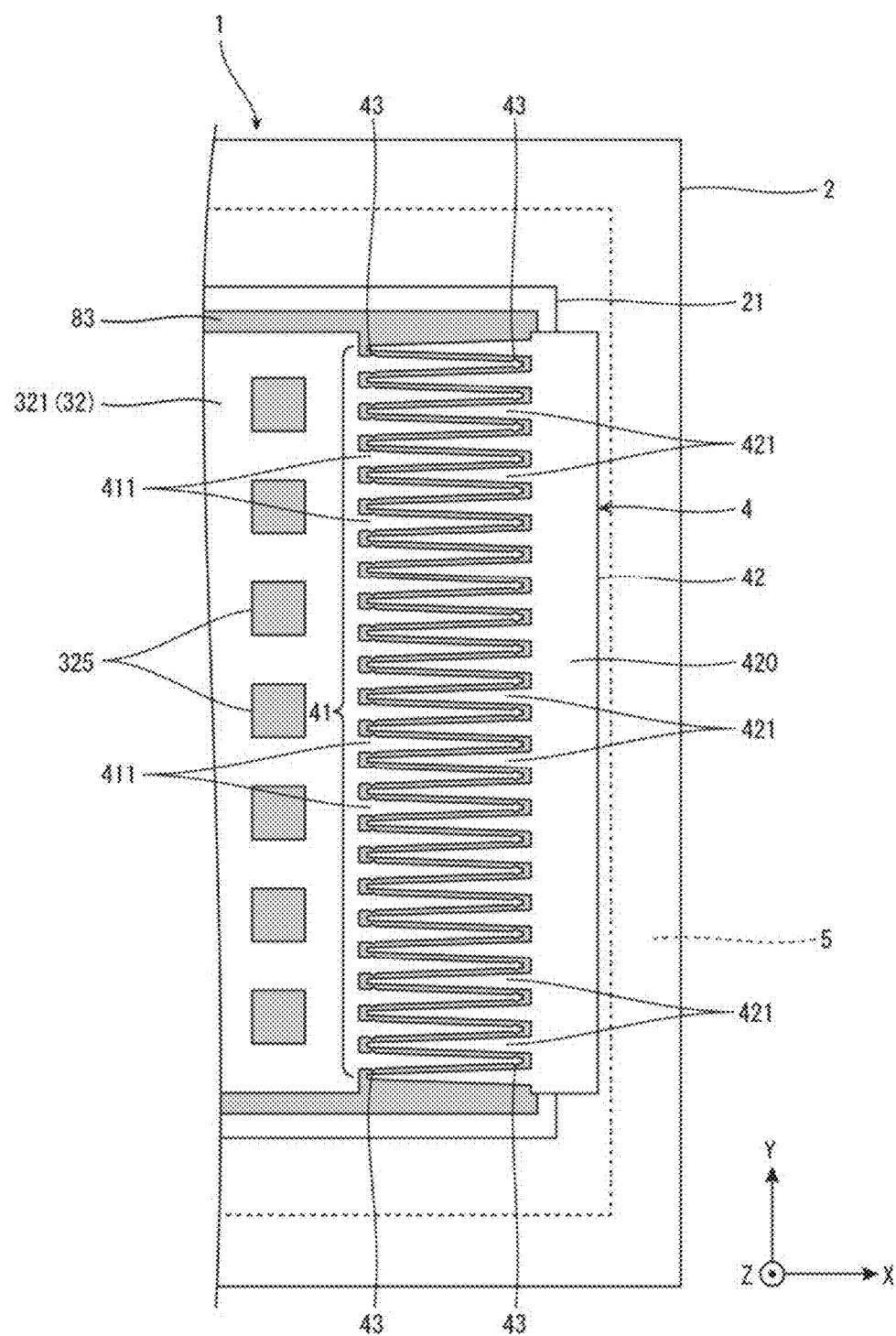
FIG. 6 is a plan view showing an attenuator according to a third embodiment.
Figure 7:
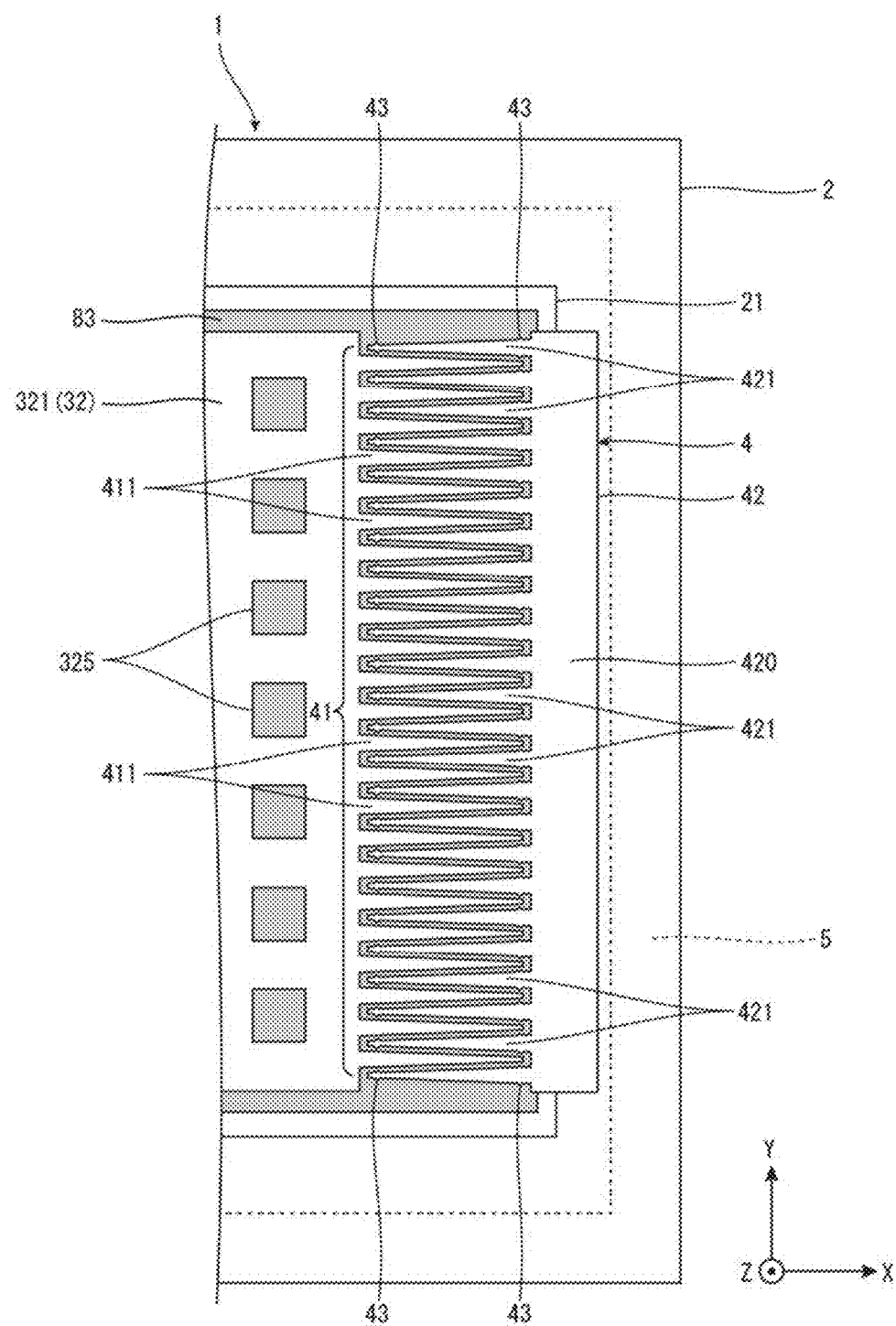
FIG. 7 is a plan view showing a modification of the attenuator.

FIG. 6 is a plan view showing an attenuator according to a third embodiment. FIG. 7 is a plan view showing a modification of the attenuator.

The embodiment is the same as the first embodiment described above except that the configuration of the attenuator 4 is different. In the following description, the embodiment will be described focusing on differences from the above-described embodiment, and the description of the same matters will be omitted. In the drawings of the embodiment, configurations similar to those according to the above-described embodiment will be denoted by the same reference signs.

As shown in FIG. 6, in the attenuator 4 according to the embodiment, each of the movable comb fingers 411 includes protrusion portions 43 protruding toward both sides in the Y-axis direction toward the adjacent fixed comb fingers 421. Accordingly, it is possible to reduce a contact area between the movable comb finger 411 and the fixed comb finger 421 during collision, and thus it is possible to effectively prevent sticking in which the movable comb finger 411 and the fixed comb finger 421 do not return while adhering to each other.

The protrusion portions 43 are disposed at both end portions, that is, at a tip end portion and the base end portion of each movable comb finger 411 in the extending direction. Accordingly, there are two contact points with the fixed comb finger 421 during collision, and impact during collision can be dispersed. Therefore, damage to the movable comb fingers 411 and the fixed comb fingers 421 due to collision can be effectively prevented. In particular, since the protrusion portions 43 can be separated from each other by arranging the protrusion portions 43 at the tip end portion and the base end portion, the above-described effect becomes remarkable.

As described above, in the above-described inertial sensor 1, one of the movable comb finger 411 and the fixed comb finger 421 includes the protrusion portions 43 protruding toward the other of the movable comb finger 411 and the fixed comb finger 421. In particular, in the embodiment, the movable comb finger 411 has the protrusion portions 43 protruding toward the fixed comb finger 421. Accordingly, it is possible to reduce a contact area between the movable comb finger 411 and the fixed comb finger 421 during collision, and thus it is possible to effectively prevent sticking in which the movable comb finger 411 and the fixed comb finger 421 do not return while adhering to each other.

As described above, the protrusion portions 43 are disposed at both end portions of the movable comb fingers 411 in the extending direction. Accordingly, the number of contact points during collision is two, and the impact during collision can be dispersed. Therefore, damage to the movable comb fingers 411 and the fixed comb fingers 421 due to collision can be effectively prevented. In particular, since the protrusion portions 43 can be separated from each other by arranging the protrusion portions 43 at the tip end portion and the base end portion, the above-described effect becomes remarkable.

The third embodiment can also exert the same effect as that according to the first embodiment described above. In the embodiment, the protrusion portion 43 has a circular shape. The shape of the protrusion portion 43 is not particularly limited, and may be, for example, a quadrangular shape, a triangular shape, or the like. Further, in the embodiment, one protrusion portion 43 is disposed at each of the base end portion and the tip end portion, but the present disclosure is not limited thereto, and a plurality of protrusion portions 43 may be disposed at each of the base end portion and the tip end portion. As shown in FIG. 7, the protrusion portions 43 may be disposed at each of the fixed comb fingers 421, or may be disposed at both of the movable comb finger 411 and the fixed comb finger 421, although not shown.

Fourth Embodiment

Figure 8:
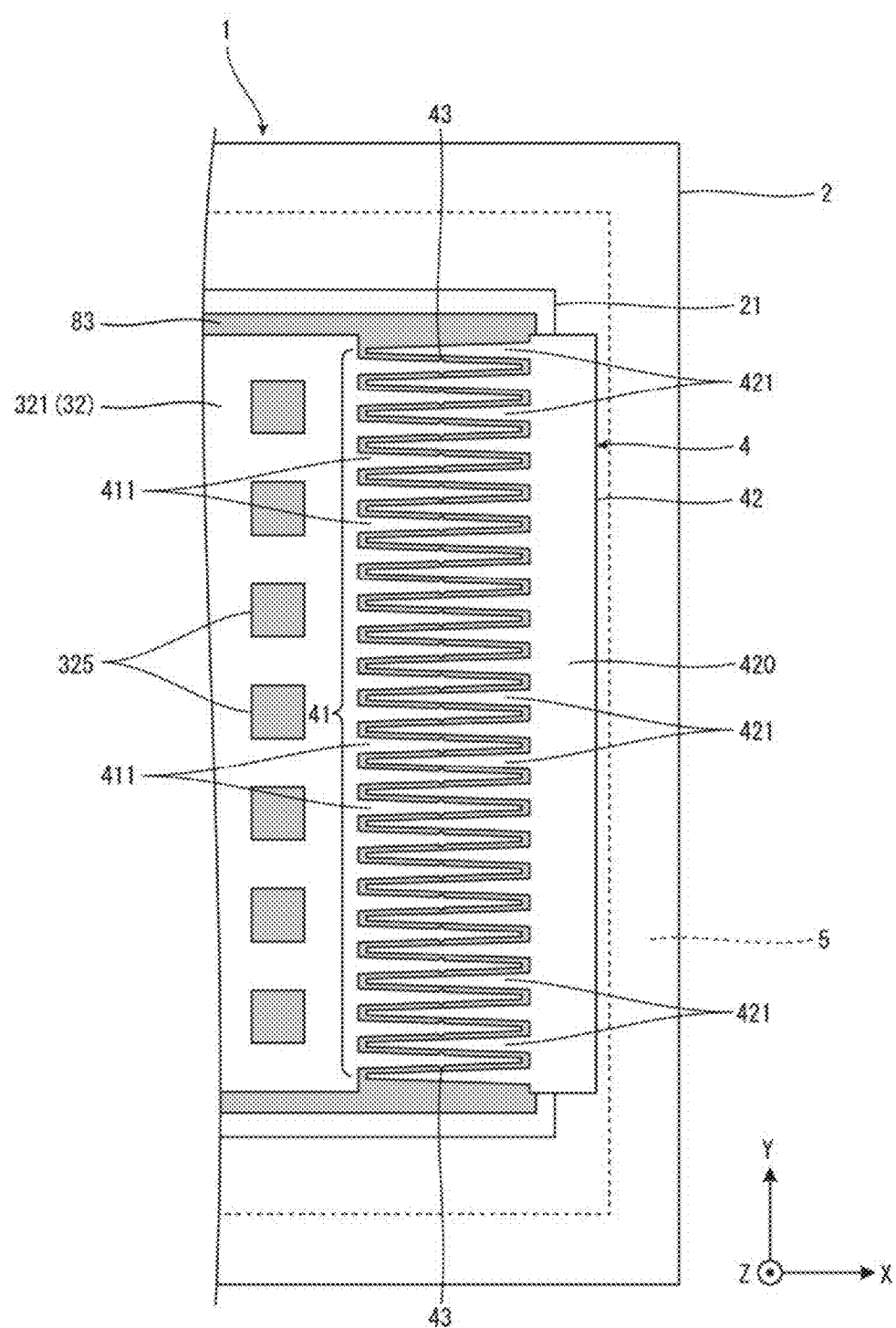
FIG. 8 is a plan view showing an attenuator according to a fourth embodiment.
Figure 9:
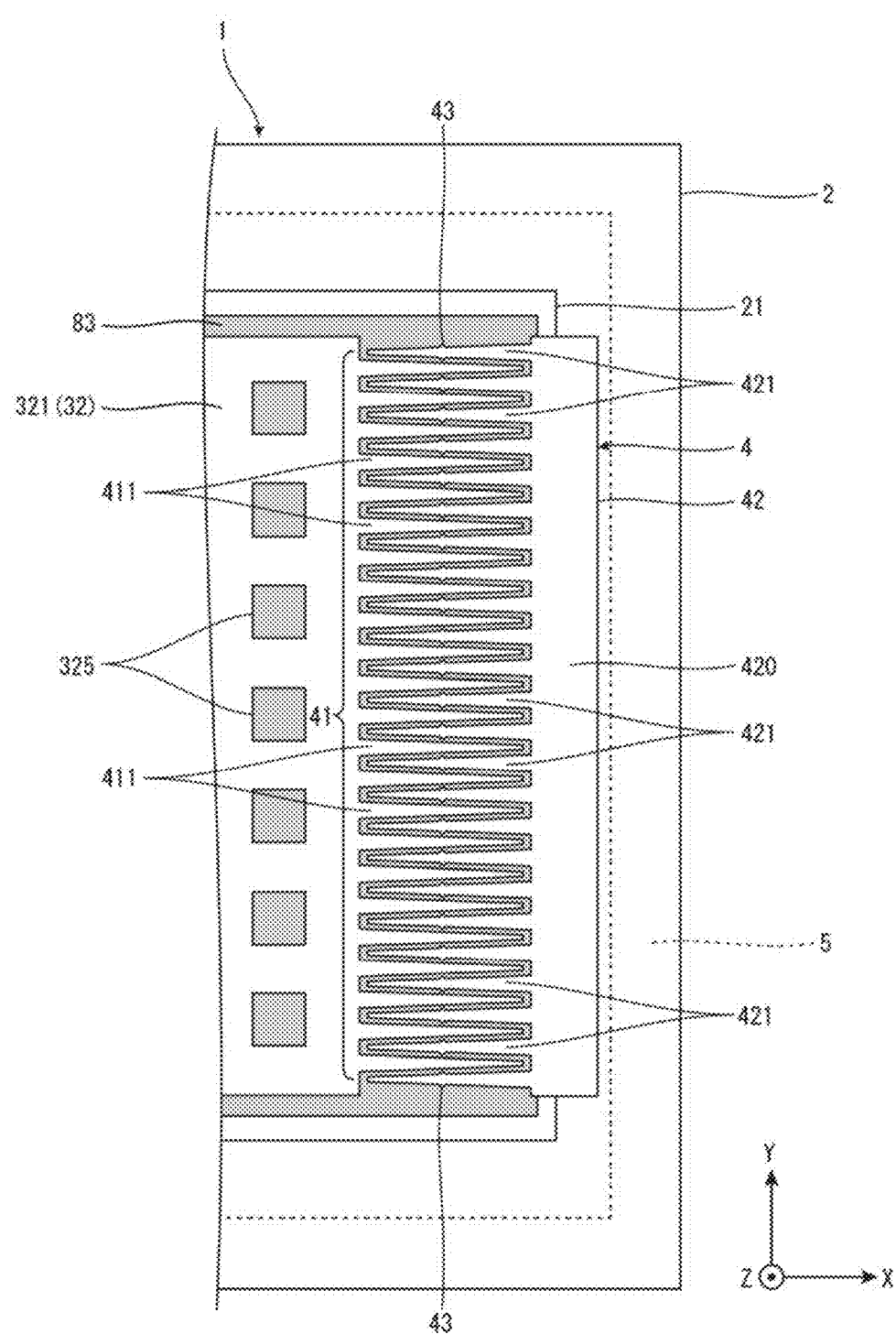
FIG. 9 is a plan view showing a modification of the attenuator.

FIG. 8 is a plan view showing an attenuator according to a fourth embodiment. FIG. 9 is a plan view showing a modification of the attenuator.

The embodiment is the same as the third embodiment described above except that the disposition of the protrusion portions 43 is different. In the following description, the embodiment will be described focusing on differences from the above-described embodiment, and the description of the same matters will be omitted. In the drawings of the embodiment, configurations similar to those according to the above-described embodiment will be denoted by the same reference signs.

As shown in FIG. 8, in the attenuator 4 according to the embodiment, the protrusion portion 43 is disposed at the central portion of each of the movable comb fingers 411 in the extending direction. Accordingly, a contact point with the fixed comb finger 421 during collision can be sufficiently separated from the base end portion of the movable comb finger 411. Therefore, the impact during collision is less likely to be transmitted to the base end portion of the movable comb finger 411, and the damage of the movable comb finger 411 can be effectively prevented.

The fourth embodiment can also exert the same effect as that according to the first embodiment described above. In the embodiment, the protrusion portion 43 has a circular shape. The shape of the protrusion portion 43 is not particularly limited, and may be, for example, a quadrangular shape, a triangular shape, or the like. In the embodiment, one protrusion portion 43 is disposed at the central portion, but the present disclosure is not limited thereto, and the plurality of protrusion portions 43 may be disposed. As shown in FIG. 9, the protrusion portion 43 may be disposed at each of the fixed comb fingers 421, or may be disposed at both of the movable comb finger 411 and the fixed comb finger 421, although not shown.

Fifth Embodiment

Figure 10:
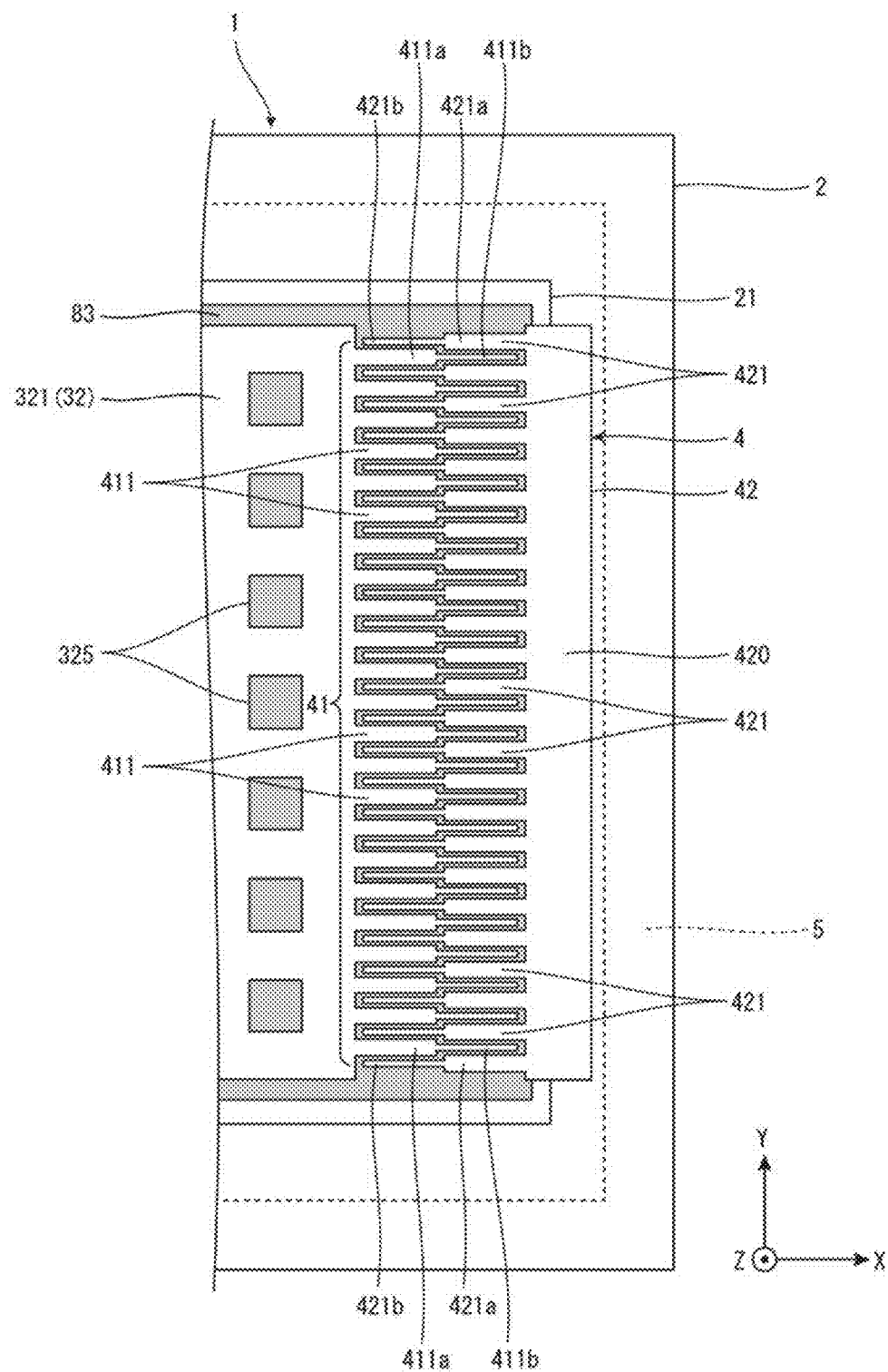
FIG. 10 is a plan view showing an attenuator according to a fifth embodiment.

FIG. 10 is a plan view showing an attenuator according to a fifth embodiment.

The embodiment is the same as the first embodiment described above except that the configuration of the attenuator 4 is different. In the following description, the embodiment will be described focusing on differences from the above-described embodiment, and the description of the same matters will be omitted. In the drawings of the embodiment, configurations similar to those according to the above-described embodiment will be denoted by the same reference signs.

As shown in FIG. 10, in the attenuator 4 according to the embodiment, each movable comb finger 411 has a base end portion 411a and a tip end portion 411b which is located on a tip end side of the base end portion 411a and which has a width smaller than that of the base end portion 411a. The base end portion 411a and the tip end portion 411b each have a constant width along the extending direction, that is, the X-axis direction. Accordingly, W1>W2 can be achieved with a simple shape.

Similarly, each of the fixed comb fingers 421 has a base end portion 421a and a tip end portion 421b which is located on a tip end side of the base end portion 421a and which has a width smaller than that of the base end portion 421a. The base end portion 421a and the tip end portion 421b each have a constant width along the extending direction, that is, the X-axis direction. Accordingly, W1>W2 can be achieved with a simple shape.

For example, since a volume of the base end portion is increased as compared with that of the tapered shape according to the first embodiment described above, rigidity of the base end portion can be improved. Therefore, the movable comb fingers 411 and the fixed comb fingers 421 are less likely to be damaged. Further, a facing area between the movable comb finger 411 and the fixed comb finger 421 is increased as compared with that of the tapered shape according to the first embodiment described above, and a damping effect is improved accordingly. Therefore, the unnecessary vibration is prevented, the detection vibration of the movable body 32 is stabilized, and the detection accuracy of the inertial sensor 1 is improved.

In the embodiment, the tip end portions 411b and 421b are coupled to tip ends of the base end portions 411a and 421a, but the present disclosure is not limited thereto, for example, an intermediate portion thinner than the base end portions 411a and 421a and thicker than the tip end portions 411b and 421b may be interposed between the base end portion 411a and the tip end portion 411b and between the base end portion 421a and the tip end portion 421b.

As described above, in the above-described inertial sensor 1, the movable comb finger 411 and the fixed comb finger 421 include the base end portions 411a and 421a having a constant width and the tip end portions 411b and 421b having a width smaller than that of the base end portions 411a and 421a and having a constant width, respectively. Accordingly, W1>W2 can be achieved with a simple shape.

The fifth embodiment can also exert the same effect as that according to the first embodiment described above.

Sixth Embodiment

Figure 11:
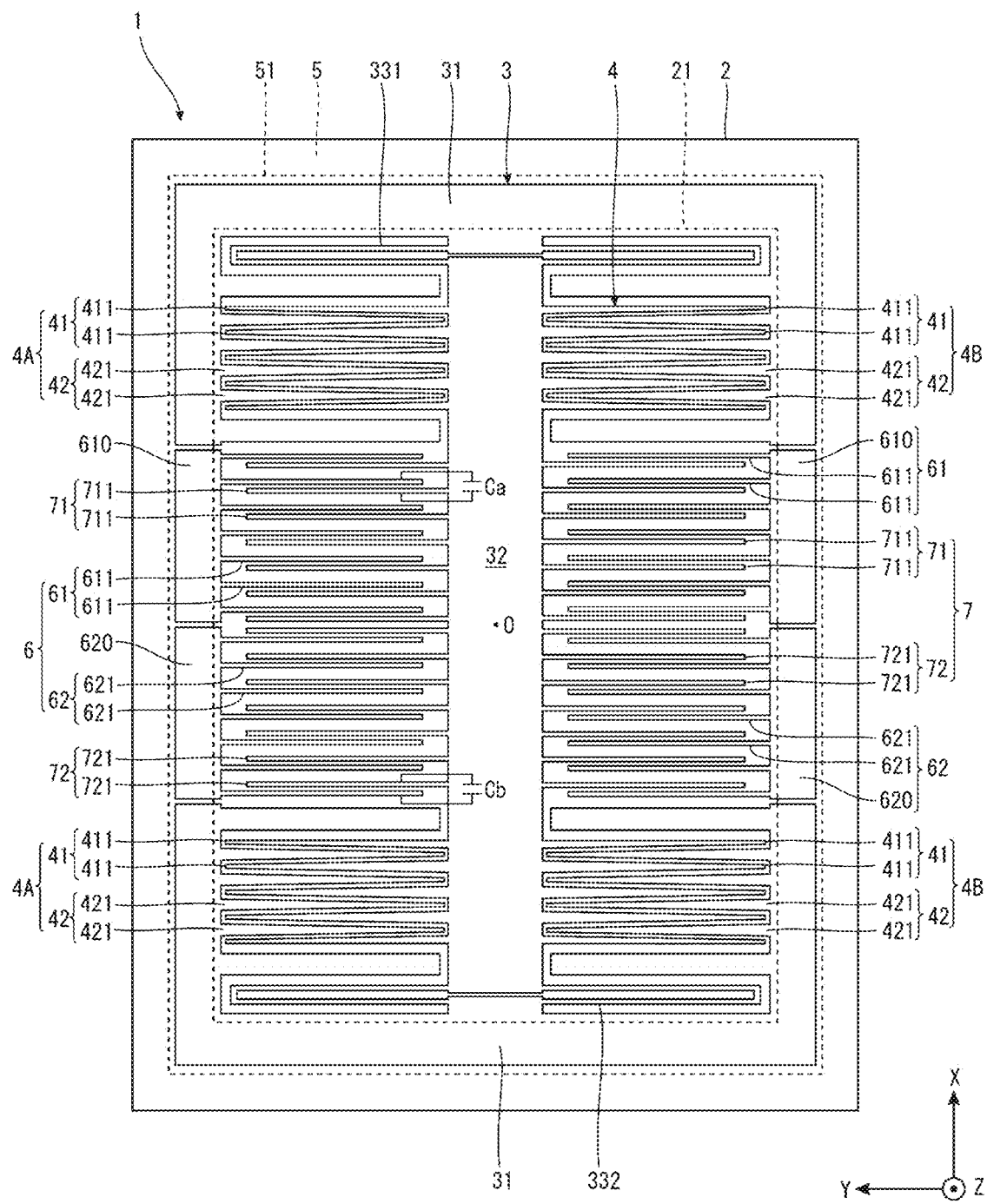
FIG. 11 is a plan view showing an inertial sensor according to a sixth embodiment.
Figure 12:
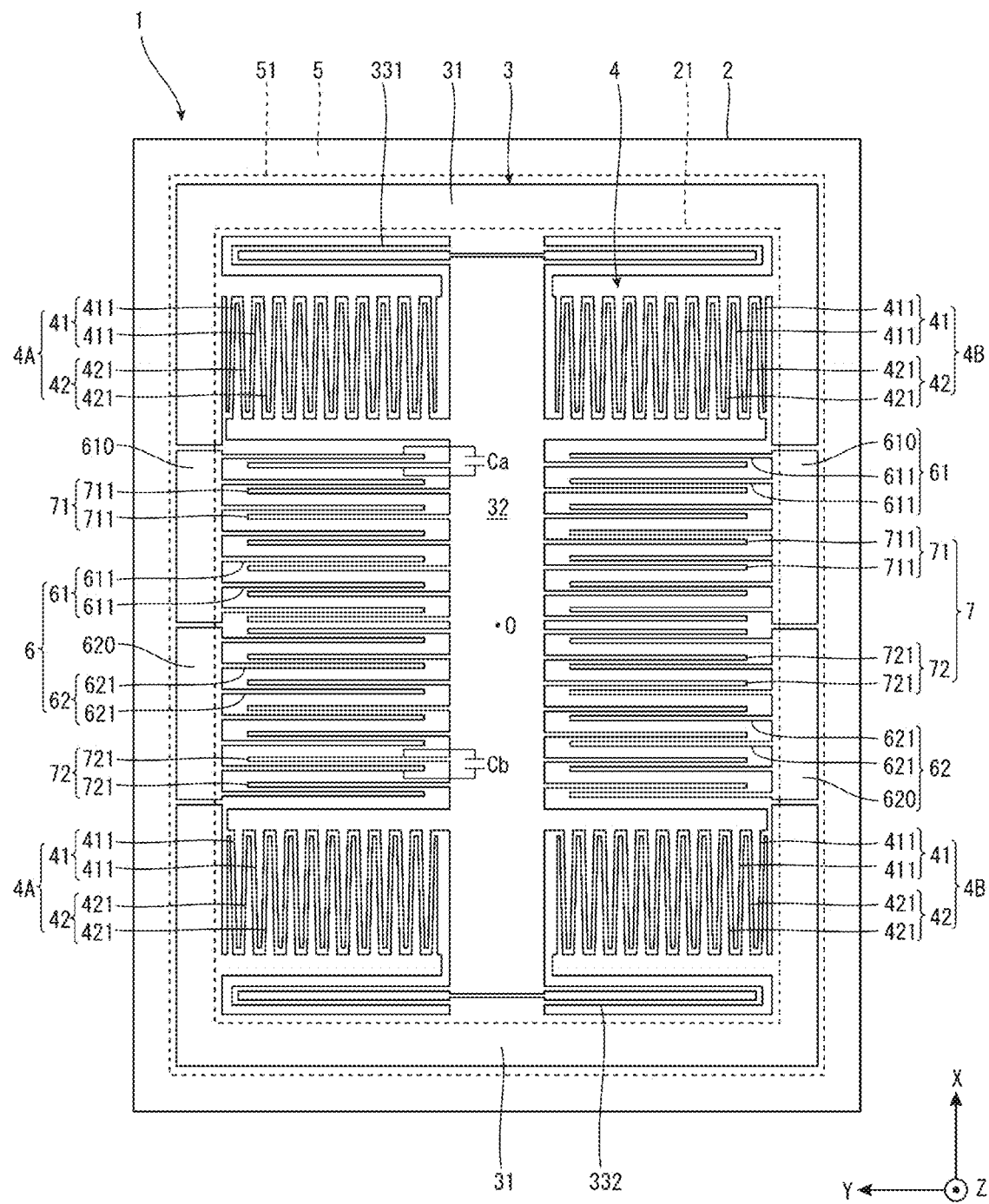
FIG. 12 is a plan view showing a modification of the inertial sensor.

FIG. 11 is a plan view showing an inertial sensor according to a sixth embodiment. FIG. 12 is a plan view showing a modification of the inertial sensor.

The embodiment is the same as the first embodiment described above except that the configurations of the sensor element 3 and the attenuator 4 are different. In the following description, the embodiment will be described focusing on differences from the above-described embodiment, and the description of the same matters will be omitted. In the drawings of the embodiment, configurations similar to those according to the above-described embodiment will be denoted by the same reference signs.

The inertial sensor 1 shown in FIG. 11 is an acceleration sensor that detects an acceleration in the X-axis direction.

The sensor element 3 includes a fixed electrode 6 fixed to the substrate 2, the anchor 31 fixed to the substrate 2, the movable body 32 displaced in the X-axis direction as a detection axis with respect to the anchor 31, beams 331 and 332 coupling the anchor 31 and the movable body 32, and a movable electrode 7 disposed at the movable body 32.

The anchor 31 is bonded to the upper surface of the substrate 2. The movable body 32 is disposed inside the anchor 31. The movable body 32 has a longitudinal shape extending in the X-axis direction, and one end portion of the movable body 32 is coupled to the anchor 31 via the beam 331, and the other end portion of the movable body 32 is coupled to the anchor 31 via the beam 332. The beams 331 and 332 are elastically deformable in the X-axis direction, and the movable body 32 is displaced in the X-axis direction with respect to the anchor 31 by the elastic deformation of the beams 331 and 332. Hereinafter, the displacement of the movable body 32 in the X-axis direction is also referred to as a detection vibration.

The movable electrode 7 includes a comb-shaped first movable electrode 71 which protrudes from the movable body 32 toward both sides in the Y-axis direction and which includes a plurality of first movable electrode fingers 711 arranged side by side in the X-axis direction, and a comb-shaped second movable electrode 72 which protrudes from the movable body 32 toward both sides in the Y-axis direction and which includes a plurality of second movable electrode fingers 721 arranged side by side in the X-axis direction. The first movable electrode 71 is disposed on the plus side in the X-axis direction with respect to a center O of the movable body 32, and the second movable electrode 72 is disposed on the minus side in the X-axis direction with respect to the center O of the movable body 32.

On the other hand, the fixed electrode 6 includes a comb-shaped first fixed electrode 61 which meshes with the first movable electrode 71, and a comb-shaped second fixed electrode 62 which meshes with the second movable electrode 72. The first fixed electrode 61 includes a base body 610 located on both sides of the movable body 32 in the Y-axis direction and bonded to the upper surface of the substrate 2, and a plurality of first fixed electrode fingers 611 extending from the base body 610 in the Y-axis direction and facing the first movable electrode fingers 711 on the plus side in the X-axis direction. Similarly, the second fixed electrode 62 includes a base body 620 located on both sides of the movable body 32 in the Y-axis direction and bonded to the upper surface of the substrate 2, and a plurality of second fixed electrode fingers 621 extending from the base body 620 in the Y-axis direction and facing the second movable electrode fingers 721 on the minus side in the X-axis direction.

When the inertial sensor 1 is driven, a drive voltage is applied to the sensor element 3. Accordingly, the electrostatic capacitance Ca is formed between the first movable electrode 71 and the first fixed electrode 61, and the electrostatic capacitance Cb is formed between the second movable electrode 72 and the second fixed electrode 62. When the acceleration in the X-axis direction is applied to the inertial sensor 1, the movable body 32 is displaced in the X-axis direction. Due to this displacement, a gap between the first movable electrode finger 711 and the first fixed electrode finger 611 and a gap between the second movable electrode finger 721 and the second fixed electrode finger 621 change in opposite phases, and accordingly, the electrostatic capacitances Ca and Cb change in the opposite phases. Therefore, the acceleration in the X-axis direction received by the inertial sensor 1 can be detected based on a difference between the electrostatic capacitances Ca and Cb.

In the inertial sensor 1, the attenuator 4 includes the first attenuator 4A located on the plus side of the movable body 32 in the Y-axis direction and the second attenuator 4B located on the minus side of the movable body 32 in the Y-axis direction.

In the first attenuator 4A, the movable structure 41 includes the plurality of movable comb fingers 411 extending from both the end portions of the movable body 32 in the X-axis direction toward the plus side in the Y-axis direction and arranged at equal intervals in the X-axis direction. The fixed structure 42 faces the movable structure 41 and meshes with the movable structure 41. The fixed structure 42 includes the plurality of fixed comb fingers 421 extending from the anchor 31 toward the minus side in the Y-axis direction and arranged at equal intervals in the X-axis direction.

On the other hand, in the second attenuator 4B, the movable structure 41 includes the plurality of movable comb fingers 411 extending from both the end portions of the movable body 32 in the X-axis direction toward the minus side in the Y-axis direction and arranged at equal intervals in the X-axis direction. The fixed structure 42 meshes with the movable structure 41. The fixed structure 42 includes the plurality of fixed comb fingers 421 extending from the anchor 31 toward the plus side in the Y-axis direction and arranged at equal intervals in the X-axis direction.

According to such a configuration, the displacement of the movable body 32 in the X-axis direction, the Y-axis direction, and around the Z-axis is prevented by the attenuator 4, and the generated displacement also rapidly converges. That is, the displacement of the movable body 32 other than the detection vibration is prevented, and the vibration in the X-axis direction, which is the detection vibration, rapidly converges. Therefore, a detection characteristic of the movable body 32 is improved.

As described above, when directions orthogonal to one another include the X-axis direction which is the first direction, the Y-axis direction which is the second direction, and the Z-axis direction which is the third direction, the above-described inertial sensor 1 is an acceleration sensor which detects an acceleration in the X-axis direction by the movable body 32 being displaced in the X-axis direction with respect to the substrate 2. The movable comb fingers 411 and the fixed comb fingers 421 extend along one of the X-axis direction and the Y-axis direction, and are arranged along the other of the X-axis direction and the Y-axis direction. In particular, in the embodiment, the movable comb fingers 411 and the fixed comb fingers 421 extend along the Y-axis direction and are arranged along the X-axis direction. Accordingly, the displacement of the movable body 32 in the X-axis direction, the Y-axis direction, and around the Z-axis is prevented, and the generated displacement also rapidly converges. That is, the displacement of the movable body 32 other than the detection vibration is prevented, and the detection vibration rapidly converges. Therefore, the detection characteristic of the movable body 32 is improved.

The sixth embodiment can also exert the same effect as that according to the first embodiment described above. The configuration of the inertial sensor 1 is not limited thereto. For example, as shown in FIG. 12, the movable comb fingers 411 and the fixed comb fingers 421 may extend along the X-axis direction and may be arranged along the Y-axis direction. According to this configuration, the same effects as those according to the embodiment can be also exhibited.

Seventh Embodiment

Figure 13:
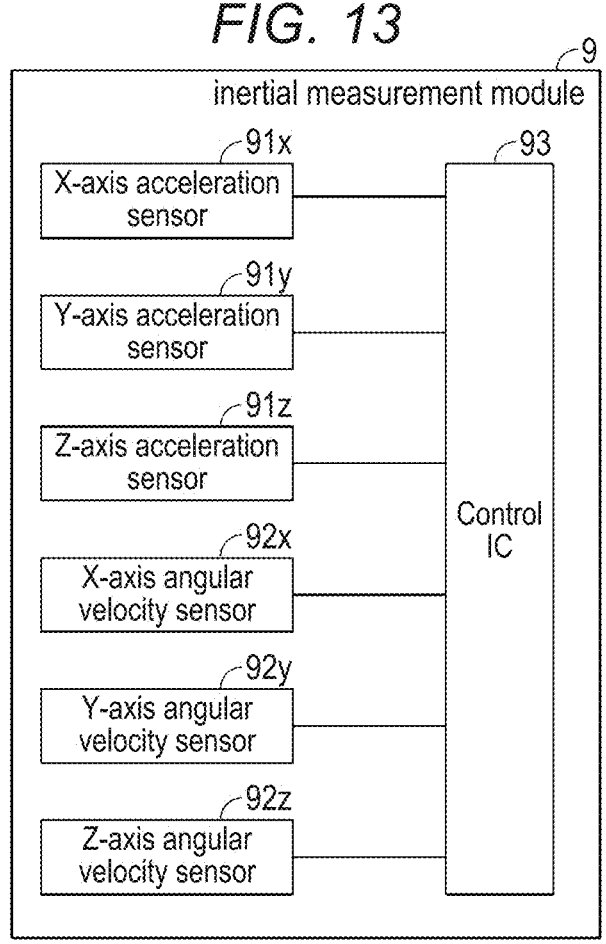
FIG. 13 is a block diagram of an inertial measurement module according to a seventh embodiment.

FIG. 13 is a block diagram of an inertial measurement module according to a seventh embodiment.

As shown in FIG. 13, an inertial measurement module 9 is a six-axis inertial measurement module, and includes an X-axis acceleration sensor 91x that detects an acceleration in the X-axis direction, a Y-axis acceleration sensor 91y that detects an acceleration in the Y-axis direction, a Z-axis acceleration sensor 91z that detects an acceleration in the Z-axis direction, an X-axis angular velocity sensor 92x that detects an angular velocity around the X-axis, a Y-axis angular velocity sensor 92y that detects an angular velocity around the Y-axis, a Z-axis angular velocity sensor 92z that detects an angular velocity around the Z-axis, and a control IC 93. For example, the inertial sensor 1 according to the above-described embodiment can be applied to any of the sensors 91x, 91y, 91z, 92x, 92y, and 92z.

The control IC 93 is a micro controller unit (MCU), and controls each unit of the inertial measurement module 9. A storage unit stores a program defining an order and contents for detecting an acceleration and an angular velocity, a program for digitizing detection data and incorporating the digitized detection data into packet data, accompanying data, or the like.

As described above, the above-described inertial measurement module 9 includes the inertial sensor 1. Therefore, the effects according to the above-described inertial sensor 1 can be attained, and the inertial measurement module 9 having high reliability can be obtained.

Although the inertial sensor and the inertial measurement module according to the present disclosure have been described above based on the illustrated embodiments, the present disclosure is not limited thereto. A configuration of each part can be replaced with any configuration having a similar function. In addition, any other constituents may be added to the present disclosure. The above-described embodiments may be combined as appropriate.

What is claimed is:

1. An inertial sensor comprising:
   a substrate;
   a fixed electrode on the substrate;
   a dummy electrode on the substrate, the dummy electrode being spaced apart from the fixed electrode in a plan view;
   a movable body configured to be displaced with respect to the substrate, the movable body directly facing the first fixed electrode and the dummy electrode via a gap in the plan view, the movable body being electrically connected to the dummy electrode such that the movable body and the dummy electrode has a same potential; and
   an attenuator configured to attenuate a displacement of the movable body with respect to the substrate, the attenuator being overlapped with only the dummy electrode in the plan view, wherein
   the attenuator includes
      a comb-shaped first structure including a plurality of movable comb fingers whose base ends are coupled to the movable body, and
      a comb-shaped second structure including a plurality of fixed comb fingers whose base ends are coupled to the substrate, the plurality of fixed comb fingers intersecting with the plurality of movable comb fingers, and
   a width of the base end of each of the movable comb fingers and the fixed comb fingers is larger than a width of a tip end thereof.

2. The inertial sensor according to claim 1, wherein the movable comb fingers and the fixed comb fingers each gradually decrease in width from the base end toward the tip end.

3. The inertial sensor according to claim 1, wherein each of the movable comb fingers and the fixed comb fingers includes
   a base end portion having a constant width, and
   a tip end portion having a width smaller than that of the base end portion and having a constant width.

4. The inertial sensor according to claim 1, wherein one of the movable comb fingers and the fixed comb fingers includes a protrusion portion protruding toward the other of the movable comb fingers and the fixed comb fingers.

5. The inertial sensor according to claim 4, wherein the protrusion portion is disposed at both end portions of the one of the movable comb fingers and the fixed comb fingers in an extending direction.

6. The inertial sensor according to claim 4, wherein the protrusion portion is disposed at a central portion of the one of the movable comb fingers and the fixed comb fingers in the extending direction.

7. The inertial sensor according to claim 1, wherein when directions orthogonal to one another are defined as a first direction, a second direction, and a third direction,
   the movable body swings around a swing axis along the second direction with respect to the substrate, and
   the movable comb fingers and the fixed comb fingers extend along the first direction, and are arranged along the second direction.

8. The inertial sensor according to claim 1, wherein when directions orthogonal to one another are defined as a first direction, a second direction, and a third direction,
   the movable body is displaceable in the first direction with respect to the substrate, and
   the movable comb fingers and the fixed comb fingers extend along one of the first direction and the second direction, and are arranged along the other of the first direction and the second direction.

9. An inertial measurement module comprising:
   the inertial sensor according to claim 1.

* * * * *